United States Patent
Tung (10) Patent No.: US 7,799,374 B2
(45) Date of Patent: Sep. 21, 2010

(54) METHOD FOR MANUFACTURING FIELD EMISSION CATHODE

(75) Inventor: Tsai-Shih Tung, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 1046 days.

(21) Appl. No.: 11/309,601

(22) Filed: Aug. 29, 2006

(65) Prior Publication Data
US 2007/0138129 A1   Jun. 21, 2007

(30) Foreign Application Priority Data
Dec. 20, 2005   (CN)   .................. 2005 1 0121025

(51) Int. Cl.
C23C 16/00  (2006.01)
H05H 1/24   (2006.01)
B05D 5/12   (2006.01)
B05D 1/36   (2006.01)
B05D 7/00   (2006.01)

(52) U.S. Cl. ............. 427/248.1; 427/249.1; 427/569; 427/58; 427/123; 427/250; 427/404; 427/405

(58) Field of Classification Search ............. None
See application file for complete search history.

(56) References Cited

U.S. PATENT DOCUMENTS

| | | | |
|---|---|---|---|
| 2002/0160111 A1* | 10/2002 | Sun et al. ............... | 427/248.1 |
| 2002/0178846 A1* | 12/2002 | Dai et al. ............... | 73/866.5 |
| 2004/0227447 A1* | 11/2004 | Yaniv et al. ............ | 313/309 |
| 2005/0089467 A1 | 4/2005 | Grill et al. | |
| 2005/0112048 A1* | 5/2005 | Tsakalakos et al. ..... | 423/439 |

FOREIGN PATENT DOCUMENTS

CN     1685460 A    10/2005

\* cited by examiner

Primary Examiner—Timothy Meeks
Assistant Examiner—Kelly M Gambetta
(74) Attorney, Agent, or Firm—Jeffrey T. Knapp (57) ABSTRACT

A method for manufacturing a carbon nanotube field emission cathode includes the steps of: providing a substrate (110) with a metallic layer (130) thereon; defining holes (131) in the metallic layer; oxidizing the metallic layer to form a metallic oxide layer (132) thereon; removing portions of the metallic oxide layer in the holes so as to expose corresponding portions of the metallic layer; forming a metal-salt catalyst layer (580) on the exposed portions of the metallic layer in the holes; and growing carbon nanotubes (690) on the substrate in the holes.

20 Claims, 7 Drawing Sheets

METHOD FOR MANUFACTURING FIELD EMISSION CATHODE

FIELD OF THE INVENTION

The present invention relates generally to methods for manufacturing field emission cathodes, and more particularly to a method for manufacturing a field emission cathode with carbon nanotubes.

DESCRIPTION OF RELATED ART

Carbon nanotubes (CNTs) are very small tube-shaped structures having a composition similar to that of a graphite sheet rolled into a tube. CNTs produced by arc discharge between graphite rods were first discovered and reported in an article by Sumio Iijima entitled "Helical Microtubules of Graphitic Carbon" (Nature, Vol. 354, Nov. 7, 1991, pp. 56-58).

CNTs are electrically conductive along their length, are chemically stable, and can have very small diameters (much less than 100 nanometers) and large aspect ratios (length/diameter). Due to these and other properties, it has been suggested that carbon nanotubes can play an important role in field emission techniques.

At present, methods for producing CNTs include an arc discharge process, a pulsed laser vaporization process, and a chemical vapor deposition (CVD) process. When CNTs are used as emitters in field emission devices, they are not grown directly on a substrate of the field emission devices. Generally, the CNTs are first formed in slurry of thermoplastic polymer, and as such are randomly oriented, this slurry is printed then onto the substrate in a thick film screen-printing process. However, the CNTs provided by this method are often twisted and buried under the slurry. This means that the top layer of the slurry should be striped to expose the CNTs. Such a striping process may cause damage to the CNTs. If such CNTs are employed as the material of a field emission cathode, the electron emissivity, stability, and emission life of the field emission cathode may generally be reduced.

What is needed, therefore, is to provide a method for manufacturing carbon nanotube emitters which causes less damage to CNTs formed.

SUMMARY OF THE INVENTION

According to an exemplary embodiment, a method for manufacturing field emission cathode includes the steps of: providing a substrate with a metallic layer thereon; defining a plurality of holes on the metallic layer; anodizing the metallic layer to form a metallic oxide layer thereon; removing portions of the metallic oxide layer in the plurality of holes so as to expose corresponding portions of the metallic layer; forming a metal-salt catalyst layer on the exposed portions of the metallic layer in the plurality of holes; and forming a plurality of carbon nanotubes on the metallic layer in the plurality of holes.

BRIEF DESCRIPTION OF THE DRAWINGS

Many aspects of the present method can be better understood with reference to the following drawings. The components in the drawings are not shown necessarily drawn to scale, the emphasis instead being placed upon clearly illustrating the principles of the present method. Moreover, in the drawings, like reference numerals designate corresponding parts throughout the several views.

DETAILED DESCRIPTION OF THE INVENTION

Reference will now be made to the drawings to describe in detail the preferred embodiments of the method.

Figure 1:
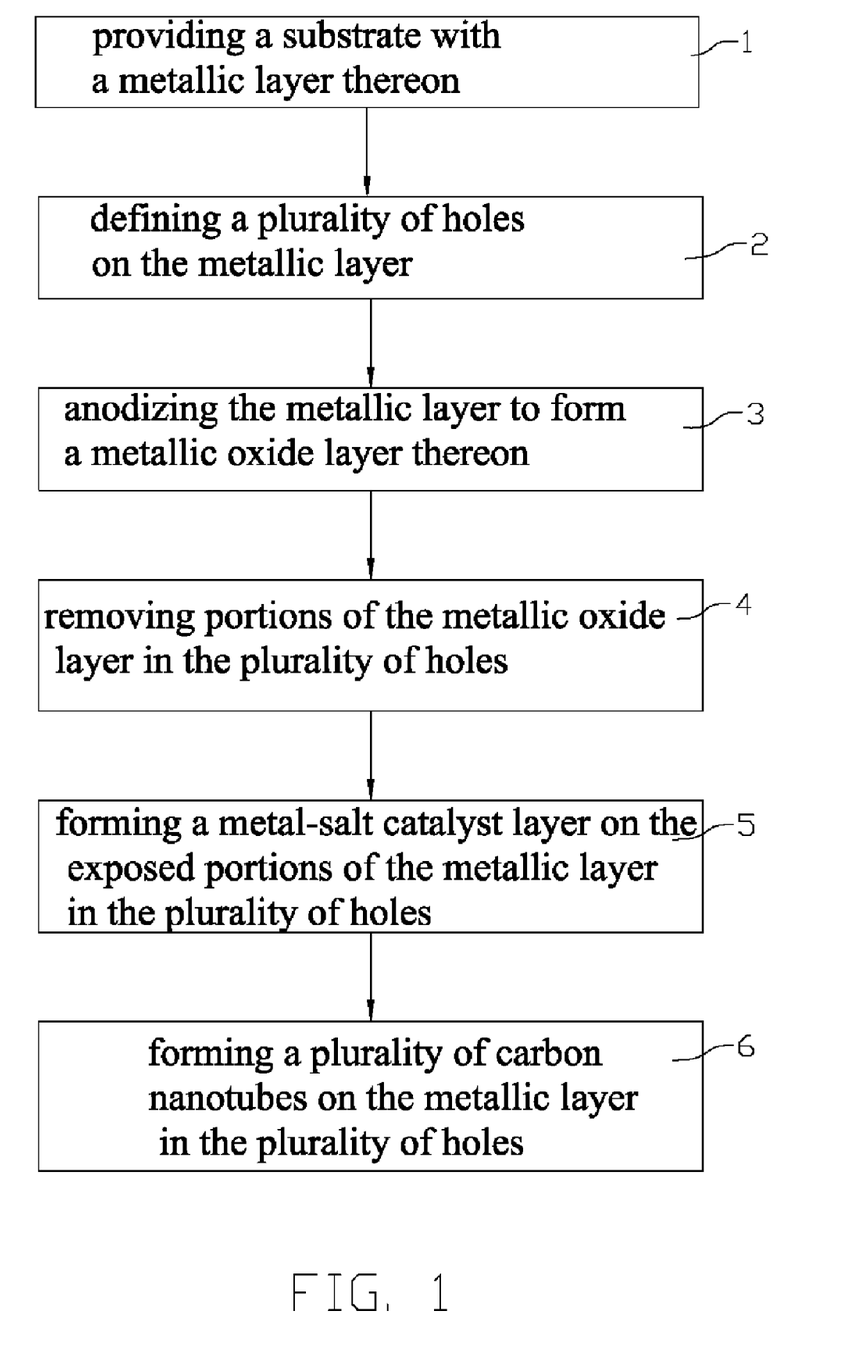
FIG. 1 is a diagrammatic flow chart of a method for manufacturing a field emission cathode in accordance with an exemplary embodiment of the present invention.
Figure 2A:
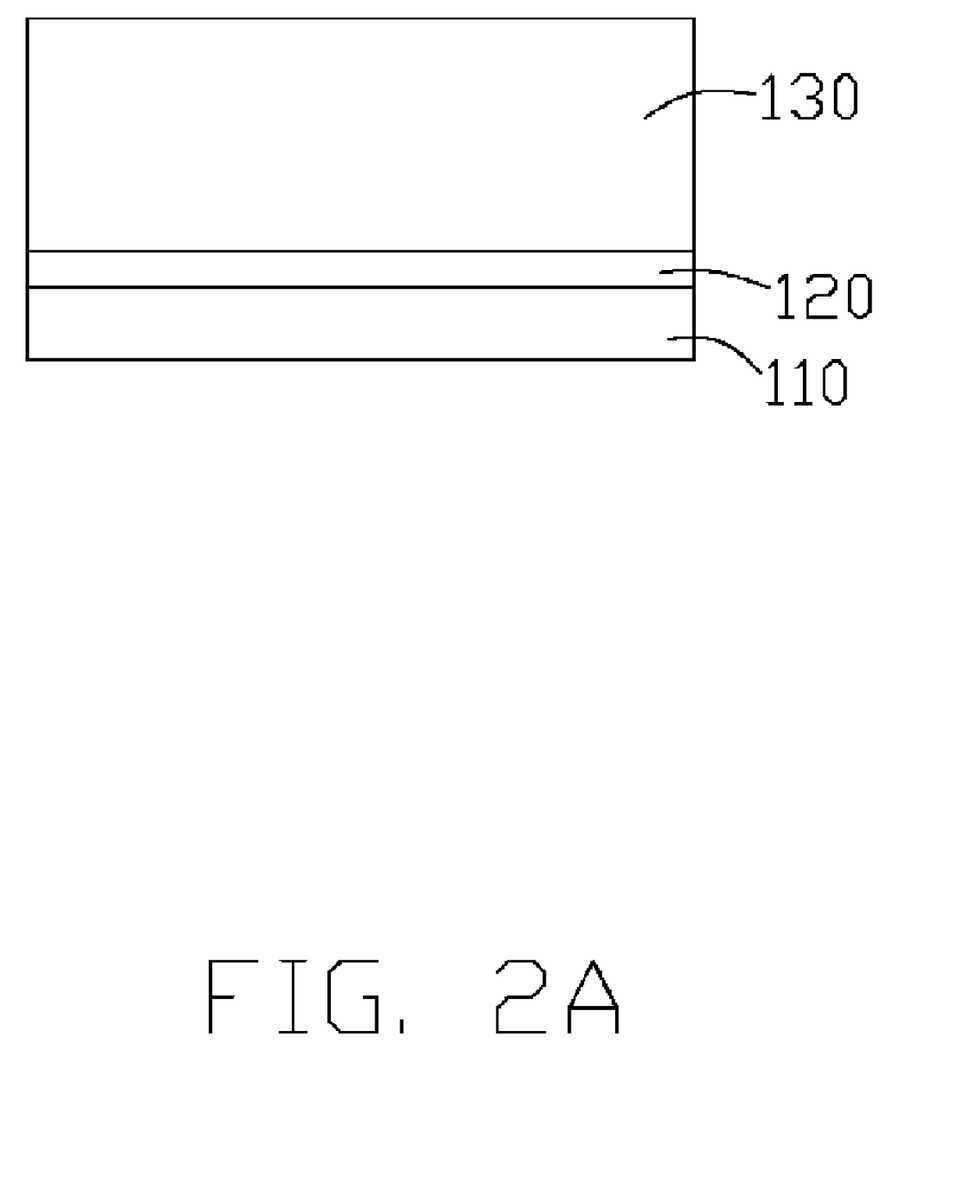
FIGS. 2A to 2F illustrate various stages of the method outlined in FIG. 1.
Figure 2B:
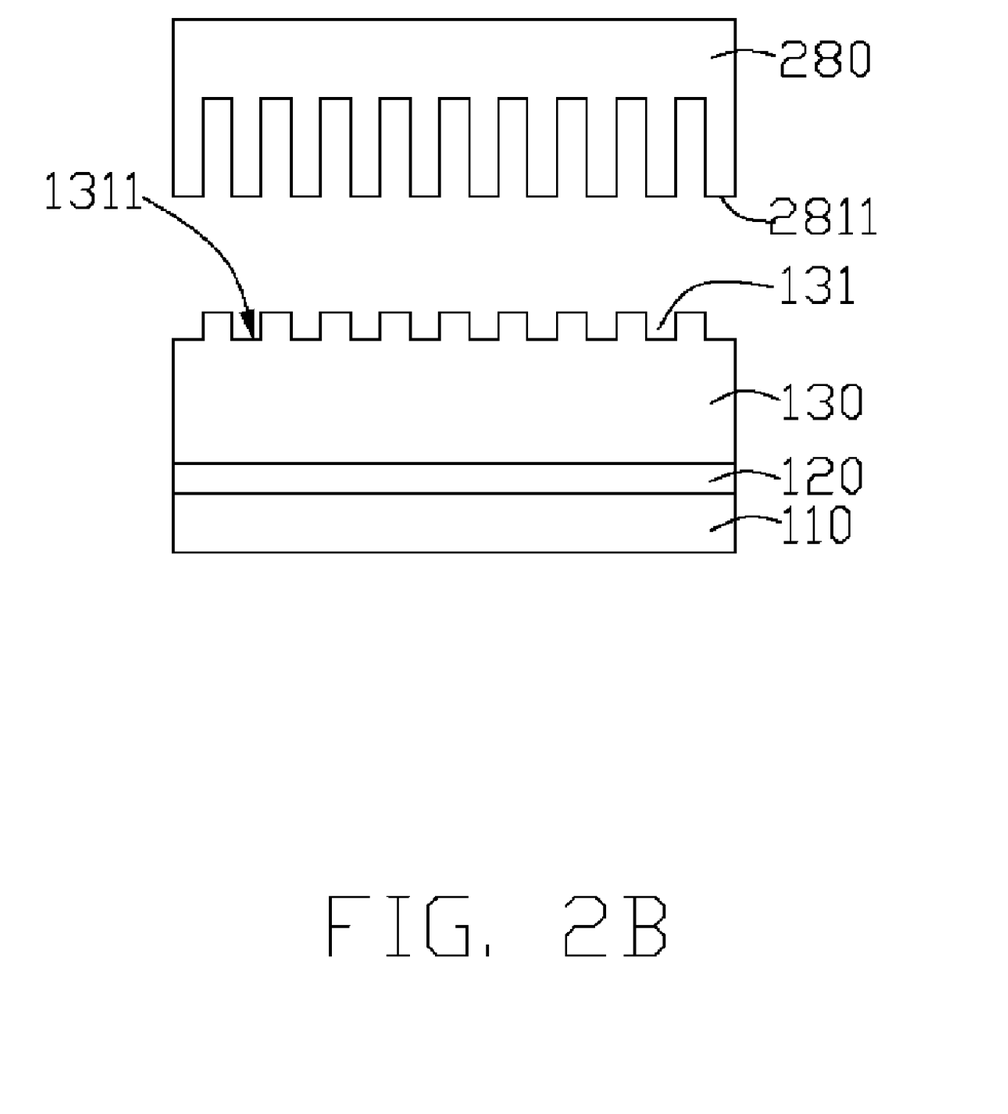
Figure 2C:
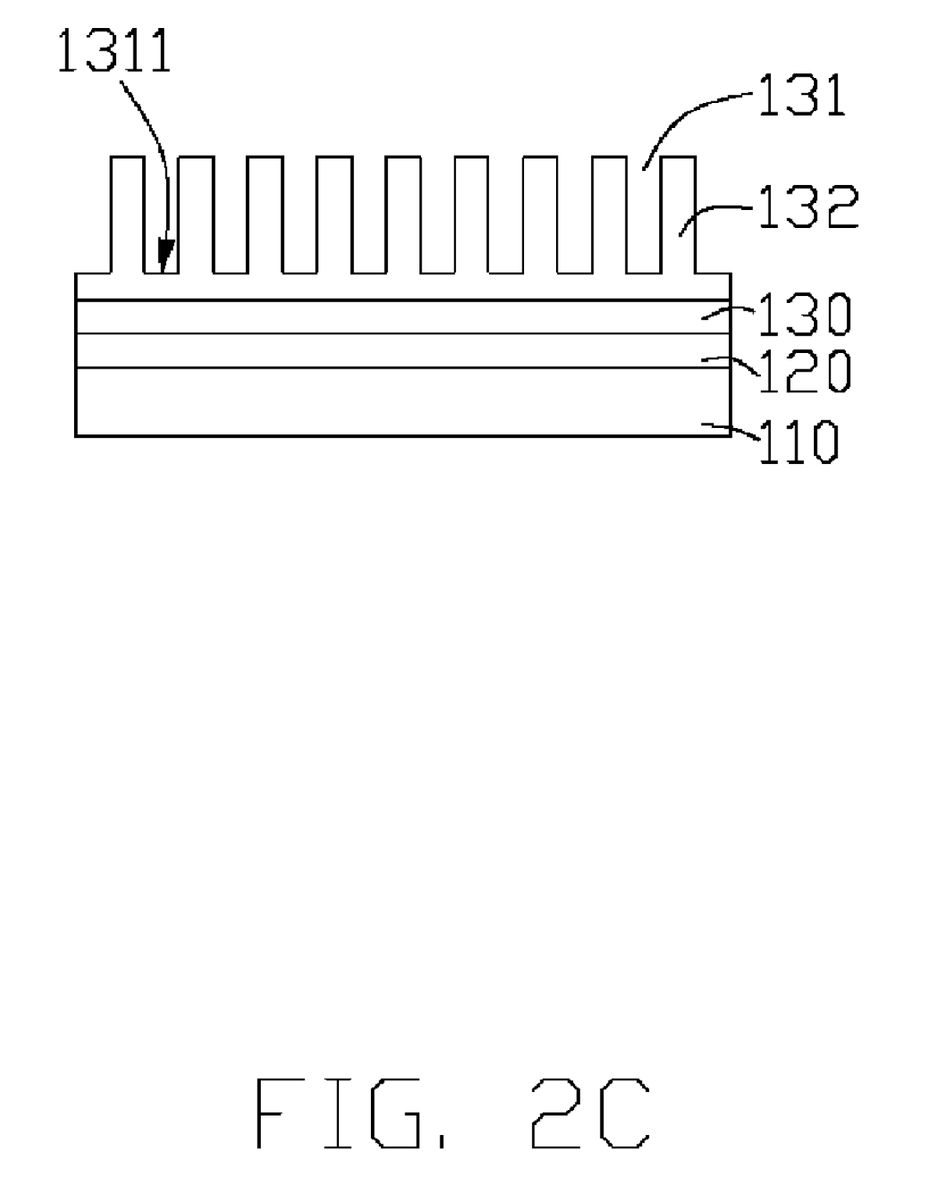
Figure 2D:
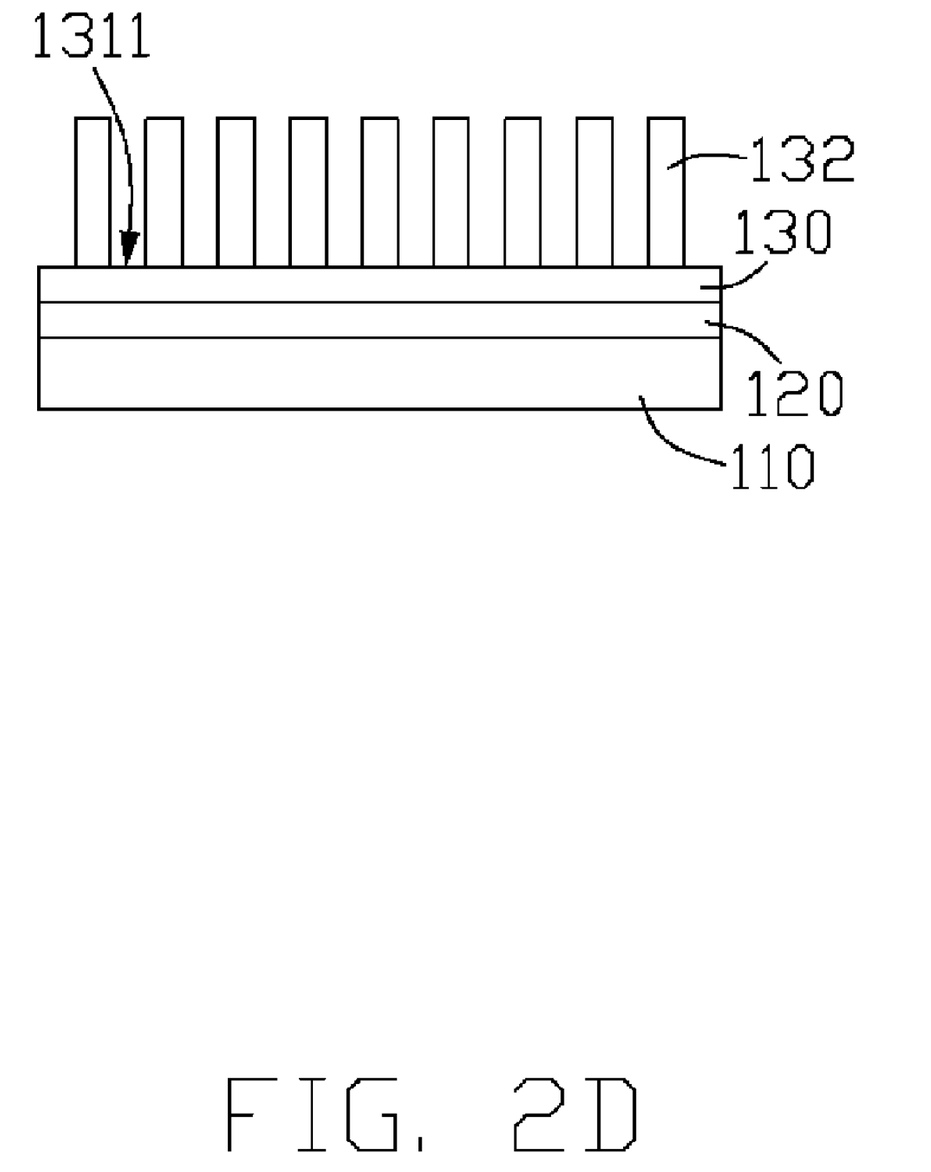
Figure 2E:
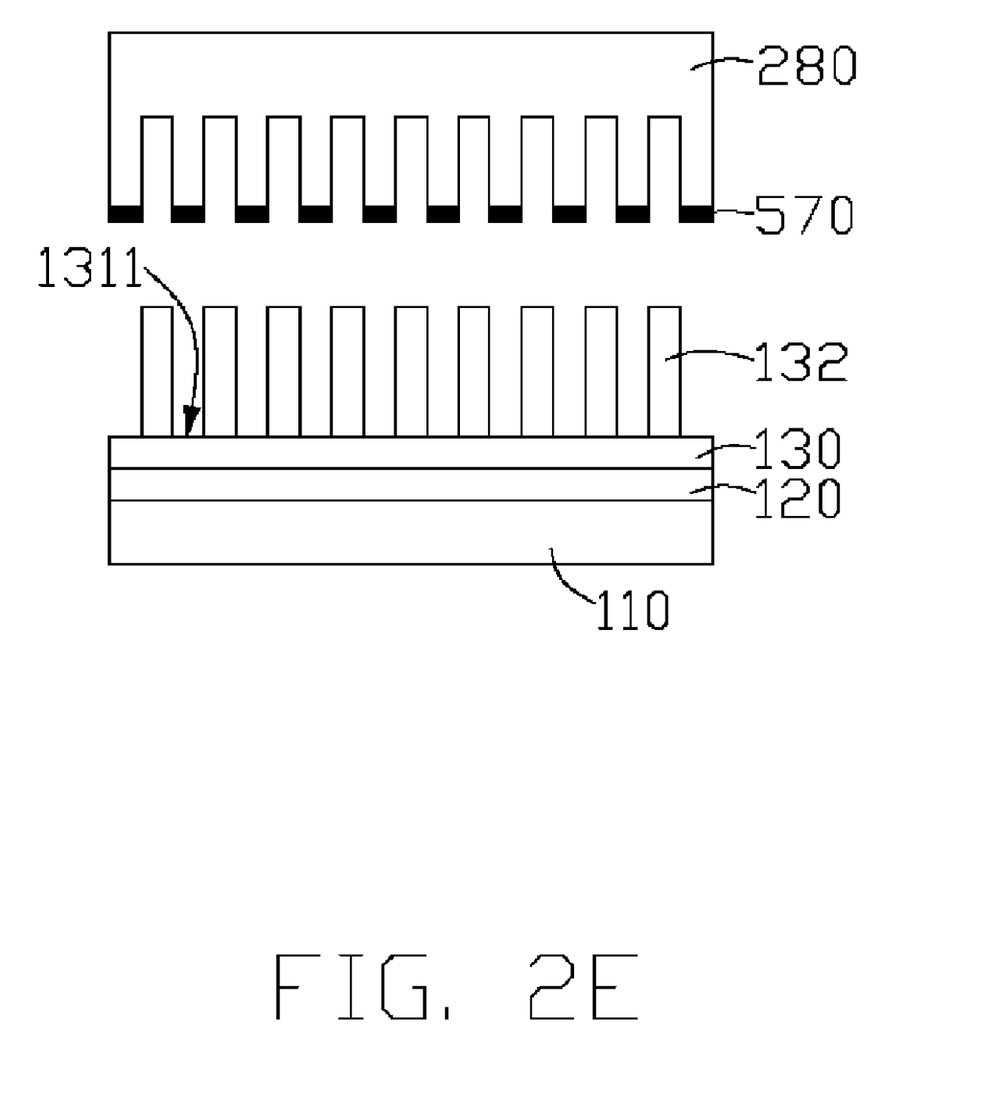
Figure 2F:
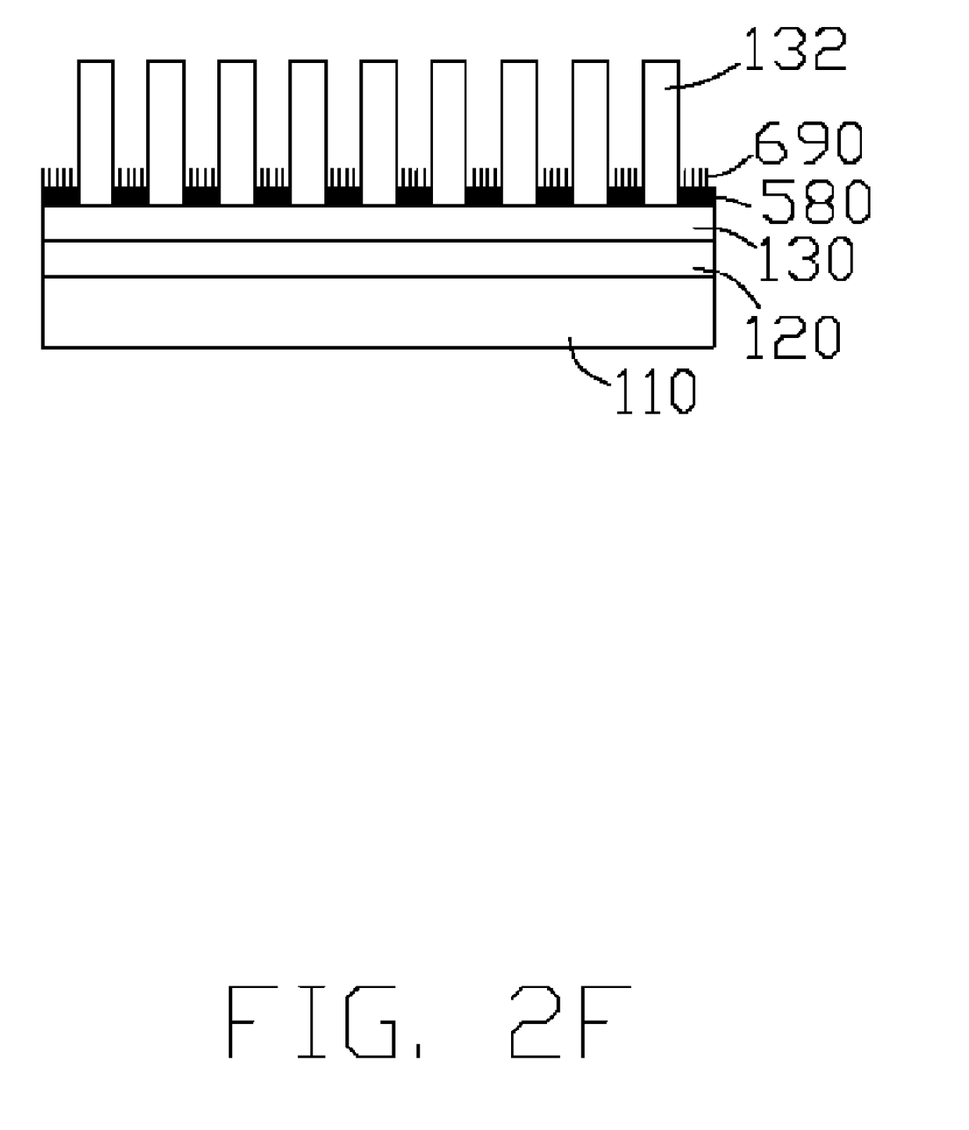

Referring to FIGS. 1 through 2F, a method for manufacturing a field emission cathode with carbon nanotubes in accordance with an exemplary embodiment is shown. The method includes the steps of:

providing a substrate 110 with a metallic layer 130 thereon;

defining a plurality of holes 131 in the metallic layer 130;

oxidizing the metallic layer 130 to form a metallic oxide layer 132 thereon;

removing portions of the metallic oxide layer in the plurality of holes 131 so as to expose corresponding portions of the metallic layer 130;

forming a metal-salt catalyst layer 580 on the exposed portions of the metallic layer in the plurality of holes 131; and growing CNTs 690 on the substrate in the plurality of holes 131.

In step (1), a material of the substrate 110 can be an insulating material such as glass, ceramic, or silicon. The substrate 110 also can be an electrically conductive substrate, for example, an indium tin oxide substrate. If the substrate made of the insulating material is provided, an electrically conductive layer 120 is generally formed on the substrate 110 before forming the metallic layer 130. A material of the conductive layer 120 can be chosen from the group consisting of silver, aluminum, niobium, nickel, or a metal alloy.

The metallic layer 130 is formed on the substrate 110 by a process selected from the group consisting of a thermal evaporation process, a sputtering process, and a thermal chemical vapor deposition process. Preferably, a material of the metallic layer 130 is selected from a group consisting of nickel, silver, aluminum and alloys thereof. Referring to FIG. 2A, in the exemplary embodiment, the metallic layer 130 is an aluminum layer 130 deposited on the electrically conductive layer 120 using a thermal chemical vapor deposition process.

In step (2), referring to FIG. 2B, the plurality of holes 131 is formed by the steps of providing a stamper 280 having a plurality of protrusions 2811, and pressing the stamper 280 and the substrate 110 together to define the plurality of holes 131 in the metallic layer using the protrusions 2811. The stamper 280 is comprised of polydimethyl siloxane (PDMS). The depth of the holes 131 can be regulated by controlling the pressure acting on the stamper 280.

Referring to FIG. 2C, in step (3), a metallic oxide layer 132 is formed by oxidizing the metallic layer 130. In the illustrated embodiment, the metallic layer 130 is oxidized by using an anodizing method for aluminum. When aluminum undergoes anodization, aluminous ions are generated from the metallic layer 130, and react with anions containing oxygen in an electrolyte as a following chemical reaction equation demonstrates:

$$2Al^{3+} + 3R^{2-} + 2H_2O \rightarrow Al_2O_3 + 3H_2R$$

where R represents a negative acid radical containing oxygen, or an oxygenic anion. After the reaction, the metallic oxide layer 132 with the plurality of holes 131 therein is formed. As the process of anodizing continues, a thickness of the metallic oxide layer 132 is increased. A shape and a depth of the plurality of holes 131 are controlled by reactive conditions, such as kind and density of the acid solution, etching time, electric current, etc. Because the acid solution pools in the holes 131, the degree of anodizing of the plurality of holes 131 is greater than that of the upper portion of the metallic layer 130.

In step (4), as seen in FIG. 2D, after the anodizing process, the metallic oxide layer 132 with the plurality of holes 131 therein is formed covering the metallic layer 130. An acid solution is used to etch portions of the metallic oxide layer 132 in bottoms of the plurality of holes 131 so as to expose the metallic layer 130 in the bottoms of the plurality of holes 131. Preferably, the acid solution used is an oxalic acid. After the etching process of the metallic oxide layer 132, corresponding portions of the metallic oxide layer 132 in the bottoms of the plurality of holes 131 are removed by washing.

Referring to FIG. 2E, in the step (5), a metal-salt catalyst solution 570 is firstly applied to top portions of the protrusions 2811, and then the stamper 280 is pressed into the plurality of holes, thereby transferring the metal-salt catalyst solution onto the exposed portions of the metallic layer 130 in the plurality of holes 131. The metal-salt catalyst solution 570 is a mixture of metal-salt particles and solvent. The metal-salt particles are comprised of a material selected from a group consisting of ferric salt, cobalt salt, nickel salt, molybdenum salt and any combination thereof. The solvent can be water or alcohol. In the illustrated embodiment, the solvent is alcohol, as it may be easily volatilized. The metal-salt particles make up about 0.01% to 10% of the total mass of the metal-salt catalyst solution 570. In the illustrating embodiment, the metal-salt catalyst solution includes hexaammonium heptamolibdate tetrahydrate [$(NH_4)_6Mo_7O_{24}\cdot 4H_2O$] and iron sulfate [$Fe_2(SO_4)_3\cdot 5H_2O$]. The percentage by mass of the hexaammonium heptamolibdate tetrahydrate is 0.01%, and that of the iron sulfate is 0.01%.

Referring to FIG. 2F, before growing CNTs on the bottoms 1311 of the plurality of holes 131, the metal-salt catalyst solution 570 is treated using a continuous process including drying and sintering. After the drying and sintering, a metal-salt catalyst layer 580 is formed. Generally, the sintering process should proceed in a vacuum environment or in a sintering furnace including protective gases. The protective gas may be argon. In the illustrated embodiment, temperature of the sintering process is in the range from about 200° C. to about 500° C. The time of the sintering process is from about 1 minute to about 10 minutes.

In step (6), the CNTs are generated using the CVD process. The CVD method employs the metal-salt catalyst layer 580 as a catalyst to grow carbon nanotubes on the surface of the catalyst by catalytic decomposition of a carbon source gas at a certain temperature. Other processes can also be used to produce the CNTs, such as microwave plasma chemical vapor deposition (MPCVD).

While the present invention has been described as having preferred or exemplary embodiments, the embodiments can be further modified within the spirit and scope of this disclosure. This application is therefore intended to cover any variations, uses, or adaptations of the embodiments using the general principles of the invention as claimed. Further, this application is intended to cover such departures from the present disclosure as come within known or customary practice in the art to which the invention pertains and which fall within the limits of the appended claims or equivalents thereof.

What is claimed is:

1. A method for manufacturing a field emission cathode, the method comprising the steps of:
   providing a substrate with a metallic layer thereon;
   defining a plurality of holes in the metallic layer;
   anodizing a top portion of the metallic layer to form a metallic oxide layer on the metallic layer, wherein the metallic oxide layer has a plurality of holes where the plurality of holes of the metallic layer were;
   removing portions of the metallic oxide layer below the plurality of holes thereof so as to expose
   corresponding portions of the metallic layer;
   forming a metal-salt catalyst layer on the exposed portions of the metallic layer in the plurality of holes of the metallic oxide layer; and
   growing a plurality of carbon nanotubes on the metallic layer in the plurality of holes.

2. The method as described in claim 1, wherein the substrate is an electrically conductive substrate.

3. The method as described in claim 1, wherein the metallic layer is formed by a process selected from the group consisting of thermal evaporation processes, sputtering processes, and thermal chemical vapor deposition processes.

4. The method as described in claim 1, wherein the plurality of holes are formed by the steps of providing a stamper having a plurality of protrusions, and pressing the stamper and the substrate together to define the plurality of holes in the metallic layer using the protrusions.

5. The method as described in claim 4, wherein the stamper is comprised of polydimethyl siloxane.

6. The method as described in claim 1, wherein the metallic layer is an aluminum layer.

7. The method as described in claim 1, wherein the portions of the metallic oxide layer in the plurality of holes are removed by etching using an acid solution.

8. The method as described in claim 1, wherein the step of forming the metal-salt catalyst layer on the exposed portions of the metallic layer comprises the steps of:
   providing a stamper having a plurality of protrusions;
   applying a metal-salt catalyst solution on top portions of the protrusions of the stamper; and
   pressing the stamper into the plurality of holes thereby transferring the metal-salt catalyst solution onto the exposed portions of the metallic layer in the plurality of holes.

9. The method as described in claim 8, wherein the metal-salt catalyst solution is a mixture of metal-salt particles and a solvent.

10. The method as described in claim 9, wherein the metal-salt particles are comprised of a material selected from a group consisting of ferric salt, cobalt salt, nickel salt, molybdenum salt and any combination thereof.

11. The method as described in claim 9, wherein the solvent is selected from the group consisting of water, alcohol and a combination thereof.

12. The method as described in claim 9, wherein the percentage by mass of the metal-salt particles in the metal-salt catalyst solution is in the range from about 0.01% to 10%.

13. The method as described in claim 9, wherein the metal-salt catalyst solution comprises hexaammonium heptamolibdate tetrahydrate [$(NH_4)_6Mo_7O_{24}\cdot 4H_2O$] and iron sulfate [$Fe_2(SO_4)_3\cdot 5H_2O$].

14. The method as described in claim 13, wherein the mass percent of the hexaammonium heptamolibdate tetrahydrate [$(NH_4)_6Mo_7O_{24}\cdot 4H_2O$] is about 0.01%.

15. The method as described in claim 13, wherein the mass percent of the iron sulfate [$Fe_2(SO_4)_3\cdot 5H_2O$] is about 0.01%.

16. The method as described in claim 8, wherein the step of forming the metal-salt catalyst layer on the exposed portions of the metallic layer further comprises the step of solidifying and sintering the metal-salt catalyst solution so as to form the metal-salt catalyst layer on the exposed portions of the metallic layer.

17. The method as described in claim 1, wherein the carbon nanotubes are fabricated by a method selected from the group consisting of a chemical vapor deposition process and a microwave plasma chemical vapor deposition process.

18. A method for manufacturing a field emission cathode, the method comprising the steps of:
  providing a substrate with a metallic layer thereon;
  providing a stamper having a plurality of protrusions, and pressing the stamper and the substrate together to define the plurality of holes in the metallic layer using the protrusions, the stamper being comprised of polydimethyl siloxane;
  anodizing the metallic layer to form a metallic oxide layer on the metallic layer;
  removing portions of the metallic oxide layer in the plurality of holes so as to expose corresponding portions of the metallic layer;
  forming a metal-salt catalyst layer on the exposed portions of the metallic layer in the plurality of holes; and
  forming a plurality of carbon nanotubes on the metallic layer in the plurality of holes.

19. The method as described in claim 18, wherein the step of forming the metal-salt catalyst layer on the exposed portions of the metallic layer comprises the steps of:
  applying a metal-salt catalyst solution on top portions of the protrusions of the stamper; and
  pressing the stamper into the plurality of holes thereby transferring the metal-salt catalyst solution onto the exposed portions of the metallic layer in the plurality of holes.

20. A method for manufacturing a field emission cathode, the method comprising the steps of:
  providing a substrate with a metallic layer thereon;
  defining a plurality of holes in the metallic layer;
  anodizing the metallic layer to form a metallic oxide layer on the metallic layer;
  removing portions of the metallic oxide layer in the plurality of holes so as to expose corresponding portions of the metallic layer;
  providing a stamper having a plurality of protrusions;
  applying a metal-salt catalyst solution on top portions of the protrusions of the stamper;
  pressing the stamper into the plurality of holes thereby transferring the metal-salt catalyst solution onto the exposed portions of the metallic layer in the plurality of holes; and
  growing a plurality of carbon nanotubes on the metallic layer in the plurality of holes.

* * * * *